United States Patent [19]
Kummermehr et al.

[11] Patent Number: 5,671,518
[45] Date of Patent: Sep. 30, 1997

[54] METHODS FOR PRODUCING A MINERAL WOOL NEEDLE-FELT AND A MINERAL WOOL PRODUCT USING A THIXOTROPIC ADDITIVE

[75] Inventors: Hans Kummermehr, Ludwigshafen; Lothar Bihy, Kaiserslautern; Reinhard Stoyke, Dudenhofen, all of Germany

[73] Assignee: Isover Saint-Gobain, Courbevoie, France

[21] Appl. No.: 119,238

[22] PCT Filed: Jan. 22, 1993

[86] PCT No.: PCT/EP93/00148

§ 371 Date: Oct. 15, 1993

§ 102(e) Date: Oct. 15, 1993

[87] PCT Pub. No.: WO93/15246

PCT Pub. Date: Aug. 5, 1993

[30] Foreign Application Priority Data

Jan. 24, 1992 [DE] Germany ............... 42 01 868.4

[51] Int. Cl.⁶ ...................... D04H 1/48; D04H 1/06
[52] U.S. Cl. ............................. 28/112; 28/107
[58] Field of Search .................. 28/103, 104, 105, 28/106, 107, 111, 112, 113, 114, 115, 122, 116; 428/210, 228, 234, 235, 236, 237, 241, 260, 268, 270, 273, 280, 281

[56] References Cited

U.S. PATENT DOCUMENTS

| | | |
|---|---|---|
| 3,663,351 | 5/1972 | Murphy ........................ 161/159 |
| 3,720,578 | 3/1973 | Heling et al. ................... 28/112 |
| 3,913,191 | 10/1975 | Smith, II ......................... 28/112 |
| 3,936,555 | 2/1976 | Smith, II . |
| 4,293,612 | 10/1981 | Andersson et al. . |
| 4,847,140 | 7/1989 | Jaskowski ....................... 28/112 |
| 5,057,173 | 10/1991 | Bihy et al. ...................... 28/112 |
| 5,112,421 | 5/1992 | Honda et al. .................... 28/107 |
| 5,174,231 | 12/1992 | White ............................. 28/112 |
| 5,322,581 | 6/1994 | Heerten et al. .................. 28/107 |
| 5,346,565 | 9/1994 | White ............................. 28/112 |

OTHER PUBLICATIONS

McCutheon's Emulsifiers & Detergents, International Edition 1985, p. 223 Oct. 22, 1985.

*Primary Examiner*—C. D. Crowder
*Assistant Examiner*—Larry D. Worrell, Jr.
*Attorney, Agent, or Firm*—Sterne, Kessler, Goldstein & Fox P.L.L.C.

[57] ABSTRACT

In order to be able to consolidate mineral fibers without binder, such as in particular glass wool into a needle-felt by needle-punching, an agent as a needling aid which comprises a thixotropizing additive having a relatively low flow viscosity during needling and thus allows to effectively support the needling process, is added to the mineral fibers. At rest, this thixotropizing additive however has an extremely high viscosity, whereby the needle-punched felt obtains good strength. In particular, for needling rock wool, suppler textile fibers are moreover added which contribute to improved mutual interlocking of the fibers, in particular in the case of mineral fibers such as basalt fibers, which can only with difficulty be interlocked by needling. A corresponding processing aid furthermore proves advantageous in the production of a crimped mat from a laminar mat, as the drastically weakened resistance against further shifting makes it possible to reorient the fibers in the crimping zone, gently and to a large degree, without the application of excessively large forces.

14 Claims, 2 Drawing Sheets

5,671,518

METHODS FOR PRODUCING A MINERAL WOOL NEEDLE-FELT AND A MINERAL WOOL PRODUCT USING A THIXOTROPIC ADDITIVE

BACKGROUND OF THE INVENTION

1. Field of the Invention

The present invention relates to an agent effective as a processing aid for processing mineral wool mats by subjecting the fibers to the influence of a force in order to cause new, stable positions of the fibers relative to each other, as well as a needle-punched felt and a crimped mineral wool product produced by utilizing this agent, and methods for producing them.

2. Description of Related Art

In needle-punching mineral wool felts a needling aid, a so-called finishing agent or avivage, must be applied to the fibers in the form of an additive. Such finishing agents are often produced on the basis of mineral oils or natural oils, fatty acid derivatives and the like. The finishing agent has the functions of making the fibers more supple and of reducing friction between the fibers during the needling process in order to prevent tearing or breaking of the fibers during needling as far as possible. The finishing agent must furthermore perform the function of a dust bonding agent in order to permit processing and use of the needle-felt without any additional dust protection measures.

These functions are performed best by a finishing agent having a low viscosity in the range of some hundreds or a few thousands of cP since such low-viscosity finishing agents, due to their low viscosity, can form a thin lubricating film to produce a good antifriction effect while requiring relatively small amounts. However the use of a needling aid having a low viscosity and thus a good "lubricating effect" also causes the fibers to easily slide out of their anchoring positions obtained in the needle-felt during the needling process. The felt just needled is thus undone and loses a major part of its inner cohesion.

Here it is known from DE-A 38 35 007 to add a certain amount of a finishing agent with an unusually high viscosity of up to 10,000 cP as a needling aid in order to consolidate rock wool with relatively small average fiber thicknesses of less than 6 μm by needle-punching. The finishing agent renders the relatively thin rock-wool fibers so supple that they can be needled without breakage or rupture of the fibers occurring despite the high viscosity of the finishing agent, while the high viscosity of the finishing agent ensures that the fibers remain in their anchoring positions immediately after the needling process. It is a disadvantage that the high viscosity of the needling aid prevents needling of all kinds of mineral wool felts at a high speed. Another disadvantage is the relatively large amount of needling aid which must be added under practical conditions for the high-viscosity finishing agent to form a film; since the finishing agent is of an organic-chemical nature it volatizes under the influence of heat while causing a considerable annoying odor, or else the finishing agent must previously be expelled in an additional operation. If thorough baking is performed immediately after the needling process to avoid an odor for the customer, as well as for strainless stabilization of the needle-felt, then the finishing agent will no longer be available as a dust bonding agent during subsequent manipulation and processing of the needle-felt up to its final installation, so that additional dust protection measures will become necessary.

A similar set of problems presents itself in the production of crimped mineral wool products as known, for instance, from U.S. Pat. No. 2,409,066 or EP-A 0 133 083. Here, too, the objective is to shift single fibers relative to each other until they reach a new final position wherein they are then to be anchored stably inside the product in order to provide it with a desired mechanical strength and stability. The higher the viscosity of the utilized finishing agent, the more force is necessary to shift the fibers relative to each other. In the case of a laminar mat to be crimped, as this force has to be applied by means of transverse forces from the edges of the latter and therefore has a very indirect effect upon individual fibers, the crimping process is rendered more difficult, if not impossible, by high-viscosity finishing agents. A low-viscosity finishing agent, on the other hand, makes it necessary to constantly maintain the force acting on the crimped product until it has hardened if the crimping is not to partly reverse before hardening.

With respect hereto, the invention is based on the objective to create an aid for processing mineral wool felts whereby fixation of the fibers in a newly obtained position relative to the other fibers is supported, without however unduly obstructing the previously occurring, desired shift of the fiber relative to the other fibers.

SUMMARY OF THE INVENTION

The solution for this problem is effected by adding a thixotropizing additive to the processing aid.

Since the processing aid comprises a thixotropizing additive, it can have an extremely high static viscosity and a low flow viscosity at the same time. The high static viscosity in excess of 100,000 cP, preferably even of 500,000 or 1 million cP according to claim 2, ensures that the fibers remain locked in their anchoring positions obtained by the needling process; due to the extremely high static viscosity of the needling aid, the fibers are not only held viscoplastically as by a syrup, but actually embedded as in wax, or glued as by a binder. The relative fluidity of the processing aid in motion, on the other hand, ensures an undisturbed mobility of the fibers relative to each other with low friction during the needling process, such that this process can be performed rapidly and without fiber ruptures or fiber breaks and leads to an optimal increase in strength as in the case of needling. Due to the fluidity caused by the action of the needles, a thin "lubricant film" can form on the fibers, with only a small amount of processing aid having to be added; this accordingly reduces the odor under the influence of heat, and previous thorough baking can thus be omitted for many examples of use. If fatty acid polyglycol esters such as Leomin OR are used as a processing aid, a transformation furthermore occurs on the fiber under conditions of use. Changes in the IR spectrum indicate a polymerization process. This leads to a further reduction in the development of odor during heating.

The thixotropizing additive preferably is a pyrogenically produced oxide, in particular pyrogenic silica. The thixotropizing effect of pyrogenically produced metallic oxide has proven to be very effective so that it leads to the greatest possible reduction in the amount of processing aid. Pyrogenic silica produced by flame hydrolysis is available at a relatively low price and thus appears best suited as a thixotropizing additive from an economic point of view.

Montmorillonite-containing clays, such as bentonite, are also suitable as thixotropizing additives. Their thixotropizing effect is smaller than that of pyrogenically produced oxides so that a larger amount of additive must be added and/or a larger amount of processing aid burned which must be added in a larger amount at higher flow viscosity values in order to form the necessary lubricating film.

Organic thixotropizing agents may also fundamentally be used as additives which are suitable for many purposes, but they decompose under the influence of heat and therefore contribute to the odor development, while if inorganic-chemical additives are used, only the remaining organic-chemical component, e.g. the oil content, of the processing aid is subject to decomposition and thus causes an odor. Inorganic thixotropizing additives are therefore preferred as processing aids according to the invention whenever the needle-punched mineral wool felt produced therewith is exposed to heat.

The thixotropizing agent is preferably used in an amount of 5 to 50% by weight (dry) proportionally to the total amount of processing aid.

The additives in the form of pyrogenic silica are preferably between 5 and 30% by weight, preferably between 10 and 20% by weight, and in particular between 10 and 15% by weight proportionally to the total amount of the processing aid.

In its turn, the agent effective as a processing aid is expediently used in an amount of 0.4% by weight at maximum and preferably of 0.2% by weight at maximum, proportionally to the weight of the mineral wool felt. If pyrogenically produced metallic oxides are used it is readily possible to further lower these values, and it has been shown that the remaining small proportion of organic-chemical substances in the mineral wool felt leads to a negligible odor and no perceptible formation of fumes during heating.

The invention also relates to a needle-punched felt produced from mineral wool by using the agent as a needling aid, which can still contain the agent used for its production, or from which the agent has been entirely or partly removed by thermal treatment or other measures.

From JP-A-Sho-62-128959, a needle-felt according to the preamble of claim 11 is known, according to which a proportion of fibers of different type having lengths between 20 and 150 mm and in amounts of 5 to 45 parts by weight proportionally to 100 parts by weight of rock wool is added to a rock wool mat which, other than glass wool, cannot be needled economically even with large amounts of finishing agent. The fibers of different type are to interlock with the rock wool fibers during needling and thereby produce a very strong felt. Herefor the fibers of different type may be admixed homogeneously to the rock wool, or also added in superposed layers. Depending on requirements of use, these different fibers may be glass fibers, ceramic fibers, staple fibers, cotton, sheep's wool, organic fibers such as nylon, polyester, polyvinyl alcohol or polyethylene as well as recycled wool consisting of these substances. Indeed it was found that at least on the laboratory scale, rock wool may be needled by admixing such fibers. Nevertheless the needling process still has the effect of destroying a considerable proportion of the rock wool fibers, such that the resulting strength of the product will not be satisfactory, i.e. the higher the needling speed, the less satisfactory it will be.

The present invention furthermore has the objective of creating a needle-felt which, during its production, can be subjected to needling at a high speed and makes it possible to obtain great strength.

Even in the case of rockwool fibers which are difficult to needle, proper needling is achieved by further introducing the measure of adding suppler fibers, such as in particular textile glass filaments with lengths in excess of 20 mm, which are compounded with the mineral fibers by needling. Hereby a considerable interlocking degree of the textile fibers or the like with the mineral fibers is achieved instead of having to interlock the mineral fibers with each other, resulting in a considerably better interlocking relationship of the fiber layer free of binder. The textile fibers or the like may be utilized in amounts and dimensions as provided according to the teaching of the Japanese laid-open publication Sho-62-128959. Preferably, however, amounts of textile fibers of less than 5% by weight are sufficient, in particular if the textile fibers were furthermore produced with fatty acid polyglycol esters such as LEOMIN OR as a sizing agent. As the textile glass fibers are provided in the form of so-called rovings, the thixotropic sizing agent has the effect of making these fibers more easily split up into single filaments under the influence of mechanical energy such as upon needling, whereby a larger proportion of interlocking occurs, which in turn advantageously increases the strength of the needle-punched final product in a simple manner.

Reduction of developing odors is furthermore essentially supported by the fact that mutual interlocking by the additional textile fibers, which is to be achieved through needling, is improved considerably. According to the invention, therefore, preferably a minute amount of needling aid between 0.01 and 0.1% by weight, preferably between 0.02 and 0.05% by weight and in particular approx. 0.03% by weight proportionally to the total mass of needle-felt is utilized. These extremely small amounts of needling aid such as LEOMIN OR are responsible for a correspondingly reduced development of odor and fumes upon heating, which consequently will not be annoying any more.

It follows that typically there is no need to entirely or partly remove the agent as a needling aid from the needle-felt before use by means of thermal treatment or other measures, although this naturally would be possible. The needle-felt according to the invention rather is installed together with the unmodified needling aid such that the latter at its final destination may additionally contribute to improved dust binding and strength, i.e. handling ease of the needle-felt, until the latter has actually been installed.

The suppler fibers may be arranged inside the needle-felt in an at least approximately homogeneous distribution in order to be able to cause interlocking according to need in any location inside the felt following the needle-punching process. It may, however, also be provided to arrange the suppler fibers in an outer layer or stratum on a large surface of a base layer or stratum; in this case, the needles introduce the textile fibers or the like through the base layer during needle-punching and interlock them there. As a matter of fact, different fiber distributions are also possible if necessary, e.g. preferred enriching in areas close to the surface of the felt web in order to achieve a preferred consolidation in those areas.

As already mentioned, the needle-felt preferably contains the suppler fibers in the form of textile glass filaments in proportions of less than 5% by weight proportionally to the total mass of the needle-felt. This very low proportion of—usually more expensive—glass filaments, in particular of multi-filament rovings, is made possible by the fact that these so-called chopped strands very lastingly support the consolidation of the felt by needling. Herein one proceeds by breaking up the multi-filament rovings into single filaments with cut lengths of e.g. 30 or 40 mm before use, such that the reinforcing fibers are available with good fineness and well distributed. As a result, even a relatively low proportion according to the invention is highly effective, such that relatively small additions are already sufficient. This is furthermore supported in that the sizing agent for the multi-filament rovings preferably contains a thixotropizing additive and thus offers less resistance for splitting up the single filaments from the rovings, whereby splitting up of the rovings can take place very gently and consequently with small losses.

The invention further relates to a mineral wool product particularly in the form of a felt or panel which is crimped in that, by the influence of a longitudinal force, a larger number of fibers of the laminar mat, which were deposited essentially in parallel to the surface, shifts into a transverse position relative to the main surfaces of the crimped mat, and which was produced while using a processing aid containing a thixotropizing additive. This has the effect of relative movement of the fibers at the crimping point, in view of the high static viscosity, occurring only at defined relative forces, with the much lower flow viscosity of the processing aid then furthering low-friction gliding of the fibers on each other into a new relative position. At a relatively low static viscosity and/or use of a relatively small amount of the processing aid of at maximum 0.4% by weight, preferably at maximum 0.2% by weight (dry) proportionally to the total mass of the mat, the degree of mat compression before the point of crimping can be reduced, and thus crimping can be performed on a relatively loose mat in any case, viscosity drops from the high static viscosity to the much lower flow viscosity after the first relative movement between two fibers, such that this movement can completely reduce the forces at work practically without any obstruction, and lead to a new fiber position wherein the fiber comes to rest and is then arrested by the prevailing static viscosity until the binder added in the usual way has hardened.

Use of a thixotropizing additive furthers subsequent needling of the felt before hardening, whether for increased felting of its surface layers, or for the application of cover layers which may contain chopped strands such as rovings or the like and which may be provided with or without additives. Subsequent hardening makes the crimped felt resistant against compression.

Furthermore the subject matter of the invention is a method for producing a needle-felt from mineral wool, wherein a needling aid as well as preferably suppler fibers are added to a felt web, with the needling aid containing a thixotropizing additive as described in detail in the preceding.

Furthermore the subject matter of the invention is a method for producing a crimped mineral wool product, the fibers in which are arranged at an acute angle with the main surfaces of a mat which is produced by crimping, to form a product wherein the fibers are obtained in at least one fiberizing device and, provided with a binder, are deposited on a production line as a laminar mat, after which forces parallel to the main surfaces and in, or contrary to, the traveling direction of the line are induced after hardening of the binder and thereby crimping is achieved, with the fibers before crimping being provided with a processing aid whereto a thixotropizing additive as described in detail above was added.

In order to prevent the binder from unduly restricting mutual movement of the fibers while the processing aid only has its flow viscosity, the processing aid is added in such an amount that its effect supersedes the one of the binder which has not hardened yet. Nevertheless, as a rule, the processing aid is added in an amount of 0.4% by weight at maximum, preferably of 0.2% by weight (dry) at maximum proportionally to the total mass of the mat.

Additional consolidation during the time until hardening of the binder takes place as well as after hardening of the binder can be achieved by subjecting at least one of the surfaces of the crimped mat to a needling process before the hardening takes place. Here, as well, the thixotropizing additive supports the needling process just as in the case of production of a needle-felt, as was explained in detail further above.

Before needling, the surface of the crimped mat can furthermore be provided with an-outer layer which in turn may be crimped or laminar, depending on the requirements of the purpose of use. The outer layer preferably also contains a finishing agent with a thixotropizing additive as described above in detail, in order to support needling. The outer layer preferably also contains binder if it is to have a raised compressive strength. Whenever necessary, the outer layer can furthermore contain textile fiber filaments, preferably chopped strands e.g. in the form of rovings with a length of more than 20 mm, in order to further support needling, as described above in more detail in context with processing by needling.

Object of the invention are finally the use of a thixotropizing agent for production of a processing aid for mineral wool needle-felts as well as for crimped mats produced of mineral wool.

BRIEF DESCRIPTION OF THE DRAWINGS

The invention is in the following explained in detail by means of the drawing, wherein.

DETAILED DESCRIPTION OF THE PREFERRED EMBODIMENTS

Figure 1:
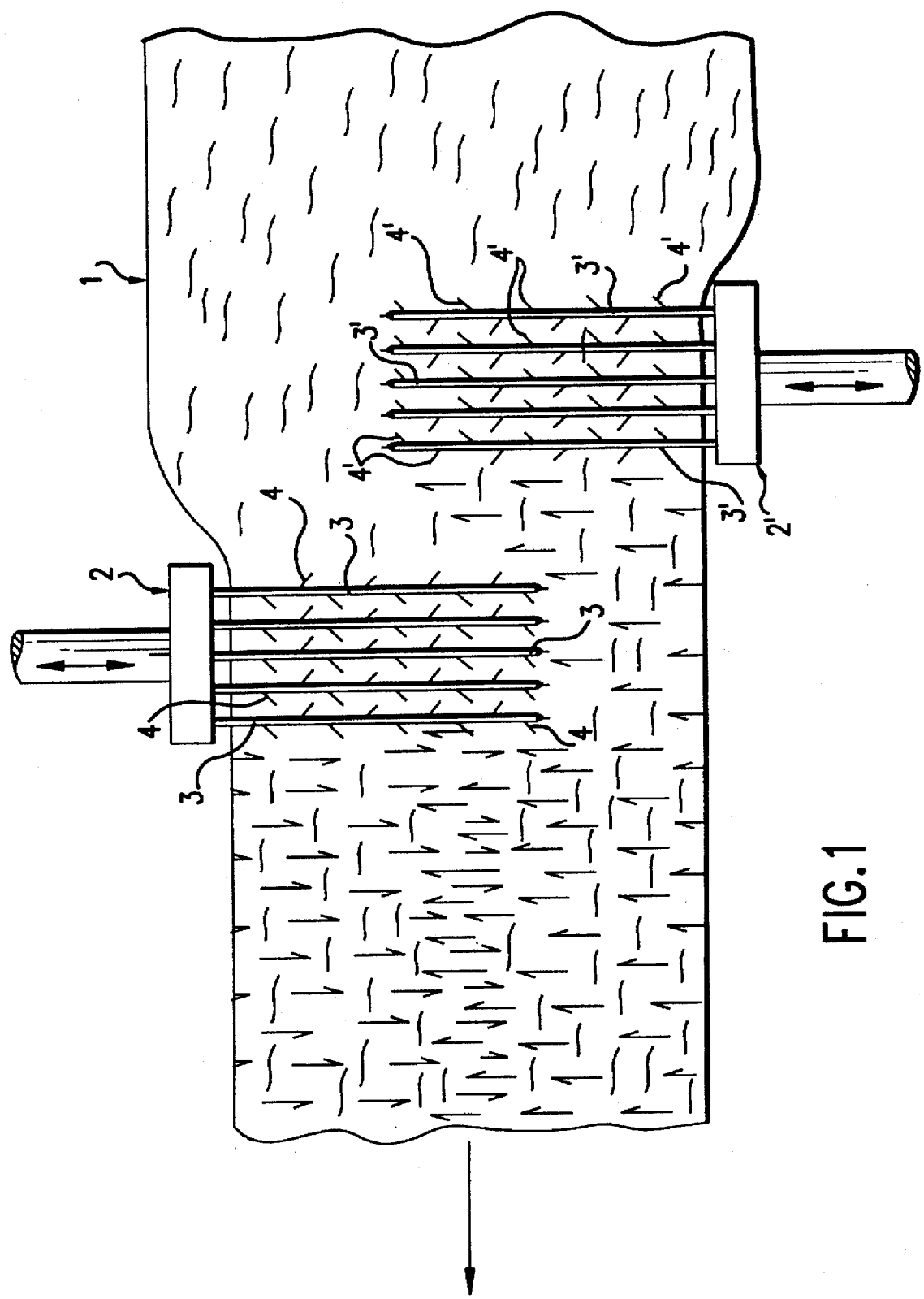
FIG. 1 is a schematic view of a needling process for the production of needle-felt.

As can be seen from FIG. 1, a mineral wool felt 1 passes by needling tools 2 and/or 2' provided with needles 3; 3'. The needles 3; 3' are provided in the known manner with hooks 4; 4', by means of which they catch fibers upon penetrating into mineral wool felt 1 material and interlock them in the surrounding material.

The needling tools 2 and 2' work concurrently, in an up-down movement, or independently.

By means of the measures explained in detail at the outset, it is possible to work at a high operating speed of the needle tools 2; 2' without, however, breaking or tearing an excessively large number of fibers with the hooks 4; 4'. In particular due to the the additional use of interspersed, suppler fibers of textile glass filaments with a considerable length of more than 20 mm, it is possible to increase mutual interlocking of the fibers by means of the needling process and therefore to also needle a material like rock wool, the fibers of which can otherwise hardly be interlocked by needling. In this way, a needle-felt with a good strength is produced which need not contain any binder and therefore—apart from the small amount of needling aid—is free of organic substances which would decompose upon heating.

Figure 2:
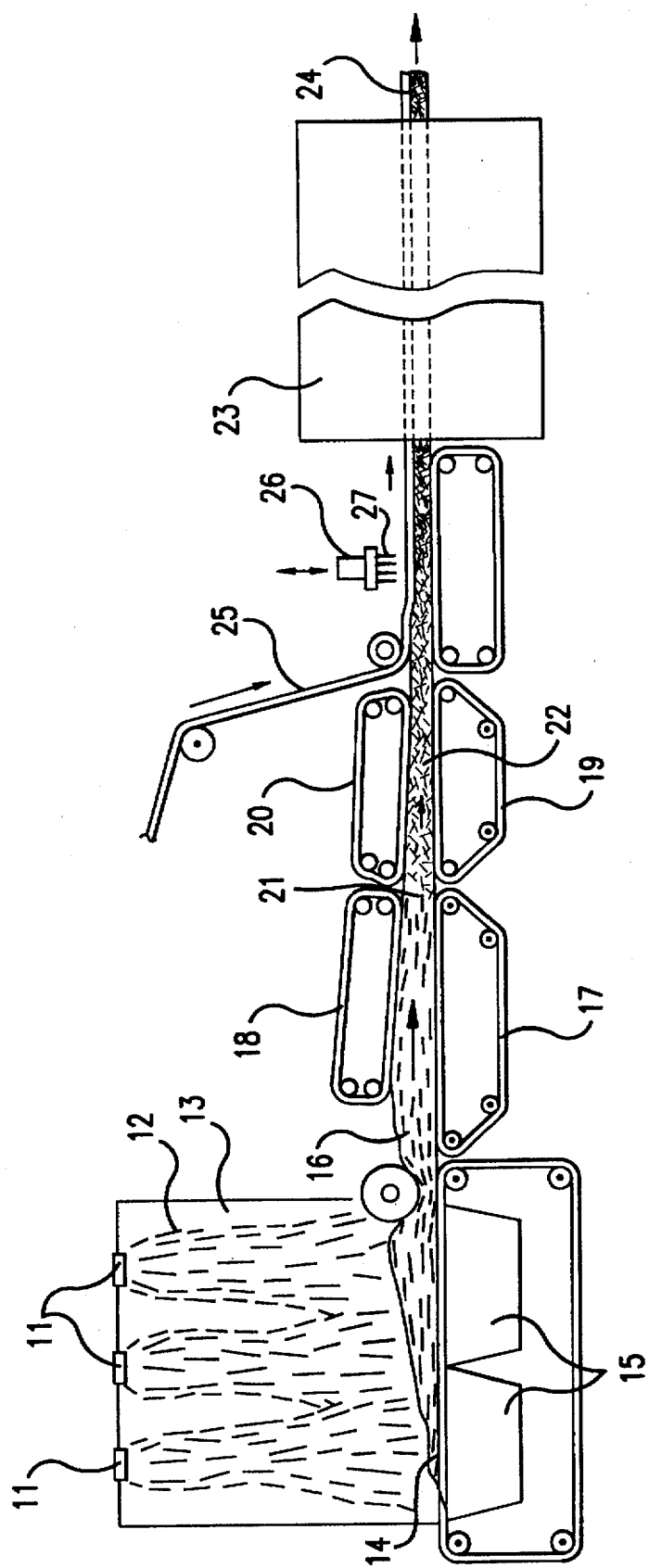
FIG. 2 is a schematic view of a crimping process for the production of a crimped mineral wool product.

FIG. 2 in a schematically simplified manner illustrates how fiberization devices 11 produce fiber veil 12 inside a chute 13 and deposit them on a production line 14. Underneath the production line 14 provided with openings for air to pass through, suction chambers 15 are arranged, the vacuum of which ensures clean deposition of the fibers for forming a laminar mat 16 on the production line 14.

The mat 16 on a conveyor 17 subsequently enters underneath a converging conveyor 18, whereby slight compacting of the mat 16 is achieved. At the exit section of conveyors 17 and 18 which are flush with each other, the mat 16 is transported in between two conveyors 19 and 20 with a runnning speed reduced as compared to that of the conveyors 17 and 18, such that mat 16 is slowed down at its main surfaces. Herefrom results a crimping of the mat 16 at the transition point shown under 21 between the conveyors 17/18 and 19/20 for a crimping of the mat 16 for formation of a crimped mat 22 wherein a considerable portion of the fibers, settled in a horizontal position on the production line 14 due to the conditions of their production, are set upright, such in the final product they can transmit forces directed transversely to the main surfaces. Such a mineral wool product shows particularly high compressive or tensile strength at its main surfaces.

Inside chute 13, binder is applied to the fibers in a known manner not illustrated in detail and caused to harden inside a tunnel furnace 23 under the influence of heat, in order to thereby form the crimped felt or panel 24. In addition, a processing aid containing a thixotropizing additive is sprayed inside the chute 13 in a similar manner as the binder. As explained in more detail at the outset, the processing aid thus has a very high static viscosity and a very low flow viscosity. The high static viscosity stabilizes the fibers in the laminar mat 16 and even more so in the crimped mat 22, such that the latter retains an essential dimensional stability at the output of the crimping conveyors 19/20 until its dimensional stability has ultimately been achieved by hardening in the tunnel furnace 23. Because of the movement in the area of the transition 21, however, the static viscosity is all of a sudden reduced until a flow viscosity is reached, such that after an initial relative movement of the fiber only a very small resistance against further movement exists and the fibers can consequently glide into new relative positions against an extremely small resistance. In this way, re-orientation of the fibers can well be controlled in the crimping zone, and it becomes possible with the small forces introduced by the conveyors 17, 18, 19 and 20 to achieve re-orientation in a gentle manner.

Following crimping, yet before hardening, consolidation of the crimped mat 22 can be achieved by means of needle-punching, if necessary. For example, fiber material for an outer layer 25 is supplied to the top side of the crimped mat 22 and subjected to the influence of a needling device 26, the needles 27 of which pierce the outer layer 25 and penetrate into the crimped mat 22 as explained in an analogous manner in this context with FIG. 1, to thereby simultaneously achieve stitching of the outer layer 25 to the crimped mat 22 and consolidation of the fibers by means of interlocking due to needling. Depending on necessity, the outer layer may or may not contain a binder which hardens inside the tunnel furnace 23. The processing aid containing a thixotropizing additive which is already provided for supporting the crimping process makes needling easier in any case insofar as it has the corresponding effect of a needling aid. Furthermore the surface area of the crimped mat 22 as well as the outer layer 25 can be optimized for consolidation by means of needling according to the measures explained in context for needle-punching, i.e. they may also contain a needling aid with a thixotropizing additive and in a given case contain additional, suppler textile fibers. The outer layer may also consist of textile fibers which are pulled into the crimped mat 22 by the needling process and anchored there in a manner consolidating the crimped mat, with there also being the possibility of advantageously adding the suppler textile fibers already inside the chute 13 such that they will distribute uniformly inside the mat 16.

Two examples of preferred embodiments shall be given below.

EXAMPLE 1

A needling aid with the following recipe was produced:
99.44% $H_2O$
0.5% Leomin OR
0.06% Cab-o-sil M5

LEOMIN OR is a fatty acid polyglycol ester with a normal viscosity of a few hundred cP which yields good fiber-fiber sliding properties and a good dust bonding effect. Cab-o-sil M5 is pyrogenic silica.

This finishing agent was applied in an amount of 0.05% by spraying onto a basalt wool felt which was subjected to needling. The basalt wool felt was produced by addition in the chute of textile glass filaments with thicknesses of 8 to 12 μm in an amount of 3% by weight proportionally to the total mass of the needle-felt and homogeneously distributed in the basalt wool on the production line. The textile glass filaments were obtained from multi-filament rovings which were treated with a sizing agent also containing a small proportion of Cab-o-sil M5 as a thixotropizing agent, and then cut to a length of 40 mm. These multi-filament rovings were subjected to the effect of splitting tools (carding drum and/or fan) inside a shredder and thereby separated into individual filaments. Due to the addition of the thixotropizing additive to the sizing agent, splitting up is effected with minimized filament breakage, as two filaments moved against each other can only exert very small forces on each other when the viscosity drops to the value of the flow viscosity. The single filaments consequently can take effect while being undamaged and well distributed, and in spite of their small mass quite considerably increase consolidation through the needling process.

It proved that due to the thixotropizing additive of pyrogenic silica, the needling aid had a high viscosity of about 600,000 cP, which, for example, corresponds to the viscosity of a thick fat. This held the fibers of the felt properly in their needled position and resulted in a strong needle-felt that perfectly keeps its form. Due to the thixotropizing effect, the viscosity drops during the needling process proper to relatively low values of at most a few thousands of cP due to the needling, so that good needling is ensured despite the small amount of needling aid introduced.

During the heating test an extremely slight odor and hardly perceptible formation of fumes were ascertained.

The following table illustrates the influence of the textile glass fibers on the strength of glass wool and basalt wool felts, both provided with the needling aid explained in the preceding, in one case without textile glass fibers and in the other case with 10% by weight of textile glass fibers.

| Product | Thickness [mm] | Bulk density [kg/m³] | σlongitudinal [kN/m²] | σtransverse [kN/m²] |
|---|---|---|---|---|
| Glass wool felt without textile glass fibers | 20 | 57 | 9,5 | 6,5 |
| Glass wool felt with 10% textile glass fibers | 20 | 53 | 13,5 | 10,0 |
| Rock wool felt without textile glass fibers | 20 | 100 | 1,0 | 0,5 |
| Rock wool felt with 10% textile glass fibers | 20 | 100 | 10,1 | 7,2 |

Insofar it is remarkable that needle-punching basalt wool felt was only made possible by the needling aid, however resulted in a relatively low strength of the basalt wool felt; on the other hand, the strength of the glass wool felt treated and needled in the same way already was well usable for many purposes. By adding 10% textile glass fibers in the form of rovings, as explained above, the strength of the glass wool needle-felt again rose sharply, while the strength of the rock wool felt multiplied and only now entered into a range of strength required for many instances of use.

EXAMPLE 2

A finishing agent as a needling aid with the following recipe was produced:

99.3% $H_2O$
0.5% Leomin OR
0.3% alumina C

Alumina C is pyrogenically produced alumina.

The same observations as in Example 1 were made with this recipe as a needling aid and an additive amount of 0.1% added to the basalt wool web. However a higher amount of thixotropizing additive was necessary herefor. In Example 1, the (dry) needling aid contained 11% of pyrogenic silica, while 37.5% of pyrogenically produced alumina had to be added in Example 2 to obtain the same qualitative effects.

All above percentages are percent by weight. It should also be pointed out that in connection with this patent, "mineral wool" includes random orientations of continuously produced textile filaments that need not necessarily be of a mineral nature.

Altogether the thixotropic additive according to the invention has the advantageous effect of little fiber breakage occurring during processing of the mineral wool mats, such that the strength of the products is additionally increased and the possibly generated amount of dust is reduced.

We claim:

1. A method for producing a mineral wool product with fiber positions at an acute angle to a main face of said product, comprising the steps of:
   producing fibers in a fiberizing device;
   providing a binder to said fibers in a chute of the fiberizing device;
   depositing said fibers in the form of a laminar mat on a production line;
   providing a processing aid to said fibers, wherein said processing aid includes a thixotropic additive; and
   crimping said laminar mat by introducing forces parallel to a surface of said laminar mat and in a direction of movement of the laminar mat before said binder hardens.

2. The method of claim 1, wherein said step of adding said processing aid comprises adding said processing aid in an amount sufficient to mask said binder before said binder hardens.

3. The method of claim 2, wherein said step of adding said processing aid comprises adding said processing aid in an amount equal to or less than 0.4% by dry weight proportionally to said total mass of said product.

4. The method according to claim 3, wherein said step of adding said processing aid comprises adding said processing aid in an amount equal to or less than 0.2% by dry weight proportionally to said total mass of said product.

5. The method of claim 1, further comprising the step of:
   needling at least one surface of said crimped product before hardening said product.

6. The method of claim 5, further comprising the step of:
   providing an outer layer to a surface of said crimped product before said step of needling.

7. The method of claim 6, wherein said outer layer contains binder.

8. The method of claim 6, wherein said outer layer includes a needling aid including a thixotropizing additive.

9. The method of claim 6, wherein said outer layer includes textile fiber filaments, and said textile fiber filaments are chopped glass strands in the form of rovings having lengths in excess of 20 min.

10. A method for producing a needle-felt, comprising the steps of:
    adding textile glass filaments to a mat of mineral fibers;
    adding a needling aid including a thixotropic additive to said mat of mineral fibers and textile glass filaments; and
    needling said mat with said needling aid to produce said needle-felt, wherein said needling aid is added in an amount not greater than 0.4% by dry weight proportionally to the total mass of the needle-felt.

11. The method of claim 10, further comprising the step of:
    splitting up multi-filament rovings to obtain said textile glass filaments.

12. The method of claim 11, further comprising the step of:
    adding said thixotropizing additive to a sizing agent for the multi-filament rovings to reduce the resistance when splitting up said multi-filament rovings.

13. The method of claim 10, wherein said step of adding said textile glass filaments comprises adding said textile glass in an amount of less than 5% by dry weight proportionally to said total mass of said needle-felt.

14. The method of claim 10, wherein said step of adding said textile glass filaments comprises adding said textile glass filaments in a chute of a fiberizing device.

* * * * *